I. A. TERRELL.
OUTLET BOX.
APPLICATION FILED MAR. 12, 1913.
1,282,317.
Patented Oct. 22, 1918.
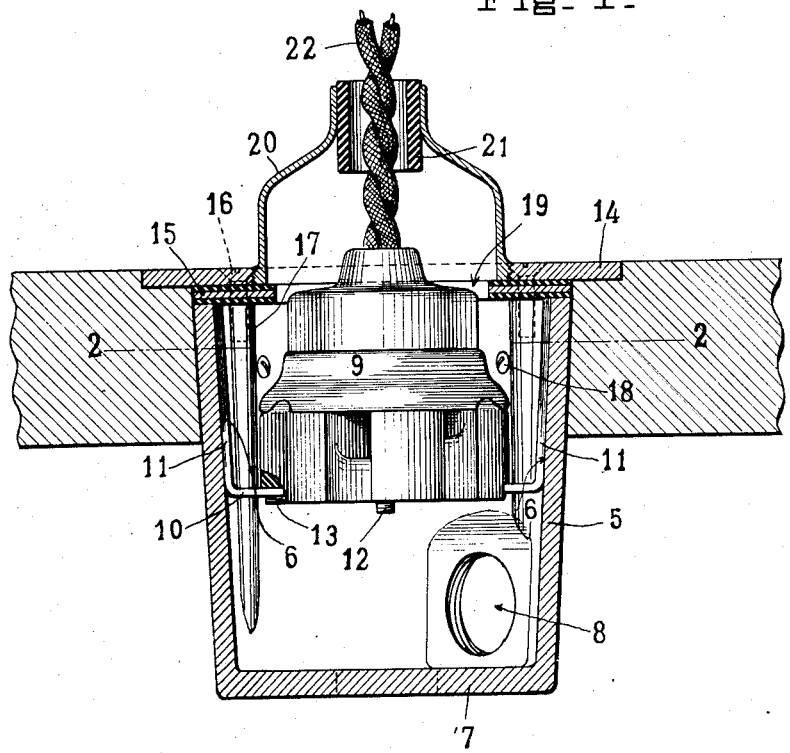
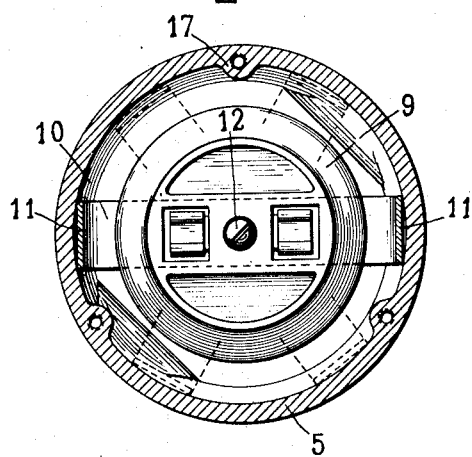
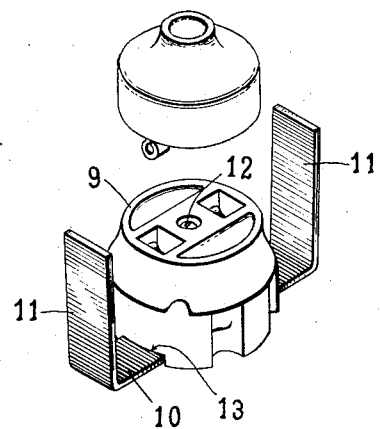
WITNESSES
INVENTOR
Irijah A. Terrell,
ATTORNEY

UNITED STATES PATENT OFFICE.

IRIJAH ALFRED TERRELL, OF NEW YORK, N. Y., ASSIGNOR TO W. R. OSTRANDER & COMPANY, OF NEW YORK, N. Y., A CORPORATION OF NEW YORK.

OUTLET-BOX.

1,282,317.  Specification of Letters Patent.  Patented Oct. 22, 1918.

Application filed March 12, 1913.  Serial No. 753,693.

*To all whom it may concern:*

Be it known that I, IRIJAH A. TERRELL, a citizen of the United States of America, and residing at New York, in the county of Kings and State of New York, have invented new and useful Improvements in Outlet-Boxes, of which the following is a specification.

This invention relates to what are generally known as "floor boxes" and while for convenience I will refer to the invention throughout in this way, I would have it understood that this expression is used merely as a convenient term and not as a limitation, for the invention may be used equally well in walls, ceilings and many other places.

The object of my invention is to produce a simple, cheap and efficient form of floor box intended for electrical wiring purposes. One of the more specific objects of the invention is to so construct a device of this character that the rosette, cut-out, socket or other electrical fixture to be mounted therein may be readily inserted and secured in place without need for any special fastening devices. Another object is to make it possible to secure the fixture in practically any desired angular relation within the box.

One feature of the invention, accordingly consists in making the box with inner walls converging inwardly toward the bottom of the box, and providing the fixture with a base to engage such walls to thereby frictionally support the fixture within the box. The opposite walls are preferably made equidistant at substantially all points so as to permit the seating of the fixture in practically any position to which it may be turned. The base of the electric fixture is preferably in the form of a bridge piece upon which the fixture is secured and this so-called bridge piece preferably has upstanding arms at its opposite ends. Another feature of the invention resides in providing a top which by engaging over the upper ends of these upstanding arms prevents withdrawal of the bridge piece and parts supported thereby.

Other features will appear as the specification proceeds.

I have, in the accompanying drawings illustrated the invention in one of its preferred forms, but I would have it understood that various changes and modifications may be made therein without departing from the true scope of the invention.

Figure 1, is a vertical sectional view of an embodiment of the invention as mounted in place in a floor.

Fig. 2, is a cross sectional view substantially on the line 2—2 of Fig. 1, indicating in dotted lines how the fixture may be turned to different positions in the box.

Fig. 3, is a perspective view of the bridge piece and fixture carried thereby.

The body of the box is designated 5 and it is as shown, preferably made with its inner opposite walls 6 converging inwardly toward the bottom 7 of the box. The bottom portion of the box is as usual in such constructions made with one or a number of openings 8 therein to receive the wires.

The electrical fixture which is mounted in the floor box is, in this particular instance a plug cut-out 9, and is shown provided with a base in the form of a bridge piece 10. This base is preferably of a size to seat down between opposite inner converging walls of the box so as to thereby frictionally support the electric fixture in place. Preferably the bridge piece is provided with upstanding spring arms 11 at its opposite ends which serve to steady it and may also be utilized to assist in frictionally holding the fixture in place, by arranging them on an outward flare, as in Fig. 1 to conform to the converging inner walls of the box. The fixture may be secured in any suitable way upon the bridge piece. In the illustration a securing screw 12 is used for this purpose and the fixture is grooved as indicated at 13 to fit down over the bridge piece.

A top 14 is preferably provided for the box and this top, which is preferably simply in the form of a narrow annular floor ring, is preferably utilized to secure the fixture in the box, which it does by engaging over the ends of the upstanding arms 11. A rubber faced gasket 15 may be placed between the upper edge of the box and the underside of the top, in which case the top would engage with the upstanding arms indirectly through the medium of this gasket. The top is shown held in place by screws 16 engaged in screw seats 17 on the inner walls of the box. By tightening these screws it will be evident that the bridge piece may be forced down into secure engagement with the walls of the box.

Fig. 2, illustrates how the fixture may be placed in the box in practically any desired angular relation. Thus after the wires are connected to the fixture it may be simply dropped down into the box in whatever may be the most convenient position.

The box may be secured in place in the opening in which it is seated by means of suitable fastening screws 18 which are projected from the inside of the box into the surrounding material of the floor or other support. The top of the box is preferably made with an opening 19 therein, of relatively large size as indicated so as to permit ready access to the fixture within the box. This opening is made large enough in the illustration to permit the withdrawal of the upper or plug part of the electric fixture from the box. When the fixture is not in use this opening in the top of the box may be closed by a flat cover disk, seated in the opening and lying flush with the floor, and when the fixture is being used, a cover cap such as that indicated at 20 may be employed, this cap having an opening 21 therein for the passage of the conductor 22 from the fixture. With this structure therefore the cover can be readily unscrewed and taken off and the removal of this cover permits ready access and inspection of the entire interior of the box. The thin floor ring 14 leaves a maximum thickness of floor to support the box. The cap 20 is screwed down into the floor ring 14 until it seats against the gasket 15 so as to afford a tight joint. The box may be fitted in an opening in the floor and secured by screws 18 while the floor ring 14 is secured to the body of the box. This insures the floor ring being level. The improvements not only reduce the cost of manufacture but also give added strength and facilitate insulation.

What I claim is:—

1. In combination, a floor box, a bridge piece seated within the box and provided with upstanding arms at its opposite ends making frictional engagement with the inner walls of the box, an electric fixture mounted upon the bridge piece and a top secured to the box engaging the upper ends of the upstanding arms to force the bridge piece down into the box.

2. In combination, a floor box having inner walls converging inwardly toward the bottom of the box, a bridge piece seated between the converging walls having upwardly extending spring arms on its opposite ends inclined to substantially fit the inclination of the converging inner walls of the box, a top secured to the box and overlying the upper ends of said spring arms to thereby prevent displacement of the bridge piece from the box and an electric fixture mounted on the bridge piece.

3. In combination, a floor box substantially circular in cross section, a bridge piece of a length corresponding to an internal diameter of the floor box and thereby adapted to be seated in various angular relations within the box, spring arms at the opposite ends of said bridge piece angularly directed to yieldingly engage the opposite inner walls of the box whereby to frictionally hold the bridge piece in the position to which it is adjusted within the box and an electric fixture supported on the bridge piece between the ends thereof and out of contact with said spring arms to thereby permit yielding of said spring arms.

4. In combination, a floor box, a bridge piece of a length equal to an internal diameter of the floor box engaging at its ends with the side walls of said floor box and thereby supported by said side walls within the floor box and having upstanding arms at the opposite ends of the bridge piece to thereby steady the bridge piece in the position in which it is seated in the box, an electric fitting mounted on the bridge piece within the box and a top detachably secured to the box and adapted to engage the upper ends of the upstanding arms to thereby prevent displacement of the bridge piece and fitting in the box.

5. In combination, a flangeless, slightly tapering, circular floor box having a relatively smooth and unobstructed exterior and screw-receiving ribs on the interior, an annular gasket of substantially the same external diameter as the rim of the box, resting on the rim of the box and projecting inwardly within the rim, a relatively thin floor ring seated on the gasket and projecting laterally beyond the rim and extending inwardly a distance short of the inner edge of the gasket and a cap having screw engagement with the inner periphery of the floor ring and arranged to screw down into engagement with the inwardly projecting portion of the gasket.

6. In combination, a floor box, an annular floor ring secured to the top thereof and provided with a screw-threaded inner periphery, a relatively rigid annular member interposed between the floor ring and the rim of the floor box and projecting inwardly beyond the inner periphery of the floor ring, said rigid member having a resilient upper face engaging the floor ring and extending inwardly beyond the screw-threaded inner periphery of the floor ring and a resilient lower face bearing on the rim of the box, a cap having screw-threaded engagement with the threaded inner periphery of the floor ring and adapted to be screwed down into engagement with that portion of the upper resilient face of the rigid annular member which projects inwardly beyond the inner periphery of the floor ring and an electrical fixture mounted in the box.

IRIJAH ALFRED TERRELL.

Witnesses:
R. S. ALLYN,
E. BRADFORD.